US007885259B2

(12) United States Patent
Filsfils

(10) Patent No.: US 7,885,259 B2
(45) Date of Patent: Feb. 8, 2011

(54) DETERMINISTIC MULTIPROTOCOL LABEL SWITCHING (MPLS) LABELS

(75) Inventor: Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 11/948,024

(22) Filed: Nov. 30, 2007

(65) Prior Publication Data

US 2009/0141721 A1 Jun. 4, 2009

(51) Int. Cl.
*H04L 12/28* (2006.01)
*H04L 12/56* (2006.01)
(52) U.S. Cl. .................................... 370/389; 370/395.5
(58) Field of Classification Search ........................ None
See application file for complete search history.

(56) References Cited

U.S. PATENT DOCUMENTS 7,620,712 B1 * 11/2009 Allan .......................... 709/224

OTHER PUBLICATIONS

R.N.Pise et al., Packet Forwarding with Multiprotocol Label Switching, Dec. 2005, World Academy of Science, whole document.*
Rosen et al., "Multiprotocol Label Switching Architecture," Network Working Group, RFC 3031, The Internet Society, Jan. 2001, 61 pages.
Rosen et al., "MPLS Label Stacking Encoding," Network Working Group, RFC 3032, The Internet Society, Jan. 2001, 23 pages.
Andersson et al., "LDP Specification," Network Working Group, RFC 3036, The Internet Society, Jan. 2001, 132 pages.
Andersson et al., "LDP Specification," Network Working Group, RFC 5036, The Internet Society, Oct. 2007, 135 pages.
Andersson et al., "Experience with the Label Distribution Protocol (LDP)," Network Working Group, RFC 5037, The Internet Society, Oct. 2007, 7 pages.
Thomas et al., "The Label Distribution Protocol (LDP) Implementation Survey Results," Network Working Group, RFC 5038, The Internet Society, Oct. 2007, 23 pages.

* cited by examiner

*Primary Examiner*—Chirag G Shah
*Assistant Examiner*—Srinivasa R Reddivalam
(74) *Attorney, Agent, or Firm*—The Law Office of Kirk D. Williams

(57) ABSTRACT

Disclosed are, inter alia, methods, apparatus, computer-readable media, mechanisms, and means for deterministically determining MPLS labels as functions of addresses of Forwarding Equivalence Classes (FECs), and using these determined labels in the forwarding of packets. By each packet switching device in a network deterministically determining the same MPLS label to use for each FEC, each packet switching device knows what label will be used by the other packet switching devices, without running Label Distribution Protocol (LDP) or another label publishing protocol. Additionally, this knowledge extends to all packet switching devices in a network, not merely neighboring packet switching devices, which allows a packet switching device to specify a stack of labels to define a desired path through the network for explicit path routing and/or fast rerouting of traffic without having to previously establish a tunnel or path using Resource Reservation Protocol (RSVP), for example.

24 Claims, 9 Drawing Sheets

* E.G., STATICALLY CONFIGURED FOR ONE OR MORE GROUPS OF FECS / PORTIONS OF THE IP ADDRESS SPACE, RECEIVED IN AN ATTRIBUTE OF A ROUTING PROTOCOL, ETC.

DETERMINISTIC MULTIPROTOCOL LABEL SWITCHING (MPLS) LABELS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

Multiprotocol Label Switching (MPLS) is a switching technology which uses a short fixed length values known "labels" to switch packets through a network. A label identifies to the receiving switching device a value from it can readily identify how to forward the packet upon receipt. A label is chosen arbitrarily (e.g., such by retrieving any unused label from a pool of currently unused labels) beforehand by the receiving packet switching device, which informs its adjacent packet switching devices on which label to use for sending packets belonging to a Forwarding Equivalence Class (FEC). In MPLS, the assignment of a particular packet to a particular FEC is done just once, as the packet enters the network. When a packet is forwarded to its next hop, the label is sent along with it. At subsequent hops, there is no further analysis of the packet's network layer header. Rather, the label is used as an index into a table which specifies the next hop, and a new label. The old label is replaced with the new label, and the packet is forwarded to its next hop.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
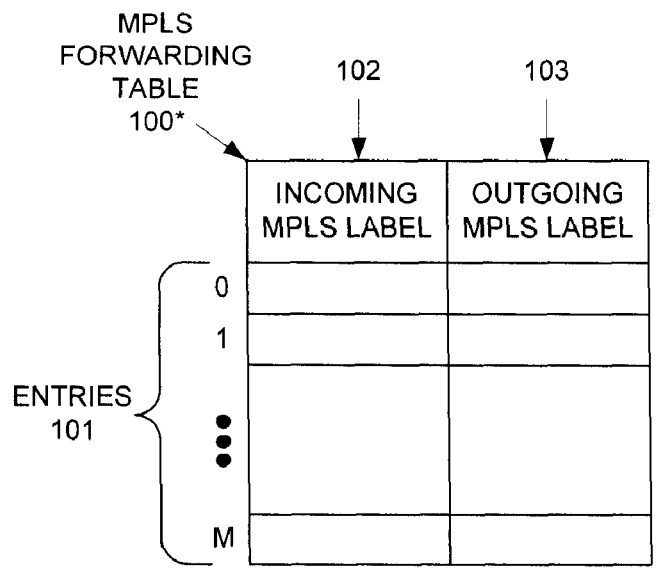
FIG. 1A illustrates an example of a MPLS forwarding table used in one embodiment.

Disclosed are, inter alia, methods, apparatus, computer-readable media, mechanisms, and means for deterministically determining MPLS labels as functions of addresses of Forwarding Equivalence Classes (FECs), and using these determined labels in the forwarding of packets. The term "deterministically" is used herein consistently with its common usage to mean a knowable outcome; having an outcome that can be predicted because all of its causes are either known or the same as those of a previous event. In other words, an MPLS label for FEC can be exactly determined as a function on the address (e.g., Internet Protocol (IP) address) of a FEC, such as in a manner within the scope and spirit of that described herein.

2. Description

Disclosed are, inter alia, methods, apparatus, computer-readable media, mechanisms, and means for deterministically determining MPLS labels as functions of addresses of Forwarding Equivalence Classes (FECs), and using these determined labels in the forwarding of packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for deterministically determining MPLS labels as functions of addresses of Forwarding Equivalence Classes (FECs), and using these determined labels in the forwarding of packets.

Currently, MPLS packet switching devices publish their local bindings of FECs to labels to neighboring nodes, so a neighboring packet switching device can associate its local binding of a FEC with its neighboring packet switching devices' bindings, so each packet switching device knows what label to use when sending a packet to a neighboring packet switching device. By each packet switching device deterministically determining MPLS labels as functions of addresses of FECs, each packet switching device knows what label will be used by the other packet switching devices using the same deterministic function. Therefore, in one embodiment, one or more packet switching device do not publish their bindings to neighboring packet switching devices (as they know the deterministically determined label will be used); in other words, these packet switching devices may not run Label Distribution Protocol (LDP) or another label publishing protocol. Furthermore, by using deterministic labels, a packet switching device knows the label bindings used by remote packet switching devices in the network, and therefore, can specify a stack of labels to define a desired path through the network for explicit path routing and/or fast rerouting of traffic without having to previously establish a tunnel or path using Resource Reservation Protocol (RSVP), for example.

One embodiment includes an apparatus (e.g., a packet switching device), comprising: a Multiprotocol Label Switching (MPLS) forwarding table including a plurality of forwarding table entries, with each said forwarding table entry associating an incoming label with an outgoing label; one or more processing elements configured to: deterministically determine for each of a plurality of Forwarding Equivalence Classes (FECs) (e.g., of neither a local address nor an address of a directly connected neighbor) a Multiprotocol Label Switching (MPLS) label as a function of the IP address of the FEC, and to update the MPLS forwarding table such that said deterministically determined MPLS label is both said incoming label and said outgoing label for one of the plurality of forwarding table entries.

In one embodiment, said deterministically determining the MPLS label includes copying a plurality of bits from the IP address of the FEC into the MPLS label. In one embodiment, said deterministically determining the MPLS label includes copying the low order n bits of the destination address into the MPLS label, wherein n is an integer greater than zero. In one embodiment, n is at least thirteen. In one embodiment, the MPLS label consists of twenty bits. In one embodiment, said deterministically determining the MPLS label comprises including a label base identifier in the MPLS label, the label base identifier uniquely identifying a portion of IP addresses of a plurality of portions of IP addresses for a network such that each FEC in the network is guaranteed to have a different said deterministically determined MPLS label despite the same value for said copied plurality of bits for two different FECs in two different portions of the plurality of portions of IP addresses. In one embodiment, the apparatus is configured to run a routing protocol to determine routing information for packet switching devices in the network, the routing protocol including an attribute for associating label base identifiers with the plurality of portions of IP addresses. In one embodiment, the apparatus is configured to retrieve the label base from a data structure stored in storage in the apparatus based on the IP address of the FEC. In one embodiment, the apparatus is configured to lookup a particular MPLS label received in a packet in the MPLS forwarding table to determine a particular outgoing label, and to forward the packet from the apparatus with the particular outgoing label.

In one embodiment, the apparatus is configured to, in response to identifying that the a particular MPLS label received in a packet does not correspond to a local address of the apparatus or a directly connected neighbor, forward the packet from the apparatus with the particular outgoing label. In one embodiment, said one or more processing elements are configured to, for each one or more FECs of directly connected neighbors, deterministically determine a MPLS label as a function of the IP address of the FEC, and to update the MPLS forwarding table such that said deterministically determined MPLS label is said incoming label and said outgoing label is null or another indication of a directly connected neighbor for one of the plurality of forwarding table entries. In one embodiment, the apparatus is configured to, in response to identifying that the a particular MPLS label received in a packet does not correspond to a local address of the apparatus or a directly connected neighbor, forward the packet from the apparatus with the particular outgoing label. In one embodiment, the apparatus is not configured to receive remote bindings of one or more FECs to corresponding one or more labels. In one embodiment, the apparatus is configured to perform fast rerouting of a plurality of packets based on said deterministically determined labels without using predefined tunnels nor using Resource Reservation Protocol (RSVP). In one embodiment, the apparatus is configured to perform explicit routing of a plurality of packets based on said deterministically determined labels without any received remote label binding information. In one embodiment, said explicit routing of packets is performed without using predefined tunnels nor using Resource Reservation Protocol (RSVP).

One embodiment includes a method performed by a packet switching device. One embodiment includes: for each particular Forwarding Equivalence Class (FEC) of a plurality of FECs: deterministically determining a Multiprotocol Label Switching (MPLS) label as a function of the IP address of the particular FEC; and updating Multiprotocol Label Switching (MPLS) forwarding table in storage in the packet switching device, the MPLS forwarding table including a plurality of forwarding table entries, with each said forwarding table entry associating an incoming label with an outgoing label; wherein said updating the MPLS forwarding table includes setting said deterministically determined MPLS label as both said incoming label and said outgoing label of one of the plurality of forwarding table entries.

In one embodiment, for each particular packet of a plurality of packets: performing a lookup operation in the MPLS forwarding table based on an incoming label received in the particular packet to identify a particular outgoing label, and forwarding the particular packet from the packet switching device with the particular outgoing label. In one embodiment, said deterministically determining the MPLS label includes copying a plurality of bits from the IP address of the FEC into the MPLS label. In one embodiment, each of the plurality of FECS are neither a local address nor an address of a directly connected neighbor.

One embodiment includes a method performed by packet switching device. One embodiment includes: deterministically determining a Multiprotocol Label Switching (MPLS) label as a function of the IP address of a Forwarding Equivalence Class (FEC); receiving an Internet Protocol (IP) packet; identifying the FEC based on the IP address of the packet; and forwarding said received packet with said deterministically determined MPLS label corresponding to said FEC. In one embodiment, said deterministically determining the MPLS label includes copying a plurality of bits from the IP address of the FEC into the MPLS label.

One embodiment includes a memory for storing data for access by an application program being executed on a packet switching device, the memory comprising: a data structure stored in said memory, said data structure including forwarding information for packets used by said application program and including: a Multiprotocol Label Switching (MPLS) outgoing label attribute for storing for a MPLS outgoing label for each of a plurality of MPLS Forwarding Equivalence Classes (FECs), the MPLS outgoing label attribute being deterministically determined as a function of the IP address of the FEC; wherein the MPLS outgoing label attribute is accessible by performing a lookup operation on the data structure based on a MPLS incoming label.

One embodiment includes a network comprising: a plurality of Multiprotocol Label Switching (MPLS) packet switching devices communicatively coupled together and configured to forward packets using MPLS for a plurality of Forwarding Equivalence Classes (FECs); wherein each particular packet switching device of the plurality of packet switching devices is configured, for each particular FEC of the plurality of FECs that is not a local address of the particular packet switching device: to deterministically determine a MPLS label as a function of the IP address of the particular FEC; and if the particular FEC is not an address of a directly connected neighbor to the particular packet switching device, to use said deterministically determined MPLS label as both the incoming label and the outgoing label in a forwarding table entry for use in forwarding packets in the network, else to use said deterministically determined MPLS label as the incoming label with the corresponding outgoing label of a forwarding table entry being null or another indication of a directly connected neighbor; wherein said deterministic determination is not performed based on any received remote bindings from another of said MPLS packet switching devices. In one embodiment, each of the plurality of MPLS packet switching devices is not configured to run Label Distribution Protocol (LDP).

Turning expressly to the figures, FIG. 1A illustrates an example of a MPLS forwarding table 100 used in one embodiment for storing labels deterministically determined as a function of addresses of FECs. As shown, each entry (101) of MPLS forwarding table 100 includes an incoming MPLS label field 102 and an outgoing MPLS label field 103. Note, one embodiment uses additional fields such as, but not limited to, an identification of the outgoing interface from which to send a corresponding packet. Therefore, the label of a received packet can be matched against the values stored in incoming MPLS label field 102 to identify a corresponding label stored in outgoing MPLS label field 103. There are many different techniques and technologies that can be used for storing MPLS forwarding table 100 and performing such lookup operations.

Figure 1B:
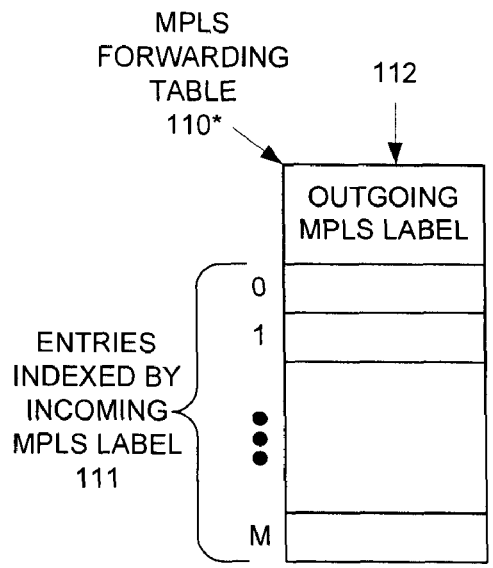
FIG. 1B illustrates an example of a MPLS forwarding table used in one embodiment.

FIG. 1B illustrates an example of a different MPLS forwarding table 110 used in one embodiment for storing labels deterministically determined as a function of addresses of FECs. As shown, entries are indexed by the value of the incoming MPLS label (101) to identify a corresponding outgoing label stored in outgoing MPLS label field 112. For example, in one embodiment, a memory is used to store the corresponding outgoing MPLS label at a memory address having a value of the incoming MPLS label. There are many different techniques and technologies that can be used for storing MPLS forwarding table 110 and performing lookup operations thereon.

Figure 2A:
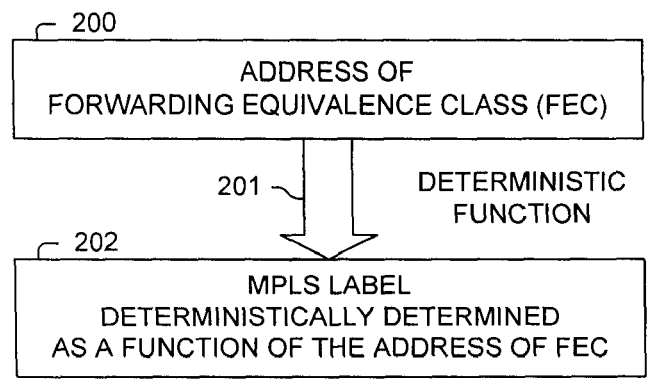
FIG. 2A illustrates an example of deterministically determining a MPLS label as a function of an address of a Forwarding Equivalence Class used in one embodiment.

FIG. 2A illustrates an example of deterministically determining (201) a MPLS label 202 as a function of an address of a Forwarding Equivalence Class (200). Many different techniques can be used by an embodiment to deterministically determine (201) a MPLS label 202 based on the address of a FEC 201. An MPLS label (202) is currently specified to be twenty bits, and an IPv4 address is thirty-two bits. So, one embodiment needs to use some deterministic function to uniquely determine the MPLS labels such that multiple packet switching devices in a network will use the same labels. There are an extensible number of techniques for doing so, such as using hashing functions, copying bits, etc.

Figure 2B:
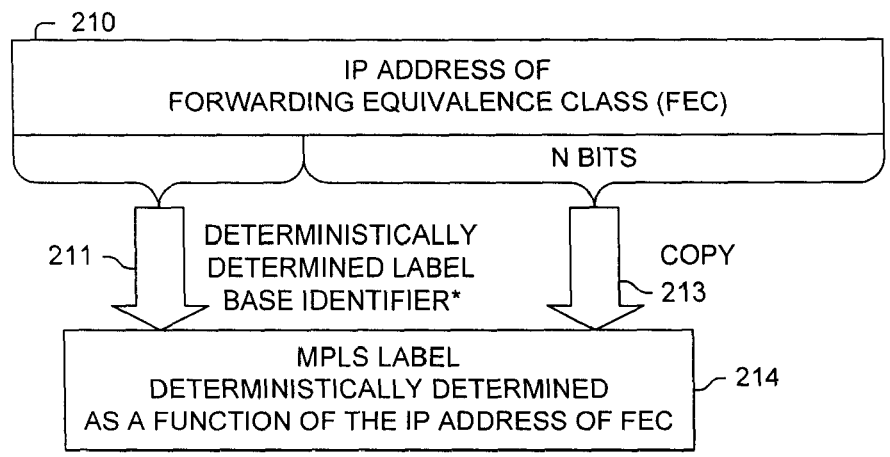
FIG. 2B illustrates an example of deterministically determining a MPLS label as a function of an address of a Forwarding Equivalence Class used in one embodiment.

FIG. 2B illustrates an example of deterministically determining a MPLS label 214 as a function (211, 213) of an address of a Forwarding Equivalence Class 210 used in one embodiment. As shown, one embodiment deterministically determines the MPLS label 214 by copying (213) N bits of the IP address of FEC 210 and using a deterministically determined label base identifier 211. In one embodiment, copy function 213 copies N low-order bits from FEC IP address 210 into the N low-order bits MPLS label 214. In one embodiment, copy function copies a different set of N bits into some predetermined N bits of MPLS label 214. Typically these bits are copied into consecutive location; although one embodiment maps these bits differently.

In one embodiment, the label base identifier is used to differentiate portions of the IP address space. For example, a MPLS switching network might switch packets from IP networks 192.0.0.0/19 and from 10.0.0.0/19. If copy function 213 copies the same N low-order bits from FEC IP address 210 into the N low-order bits MPLS label 214, there is a possibility that a same MPLS label could be generated by two different FEC addresses (e.g., by 192.0.0.3 and 10.0.0.3). Therefore, one embodiment uses label base identifiers (211)

to distinguish groups of FECs/portions of the IP address space of FECs. In one embodiment, these label base identifiers are statically configured for the various groups of FECs/portions of the IP address space of FECs. In one embodiment, these label base identifiers are acquired from an attribute of a routing protocol, such as, but not limited to, Intermediate system to intermediate system (IS-IS), Open Shortest Path First (OSPF), etc.

Figure 2C:
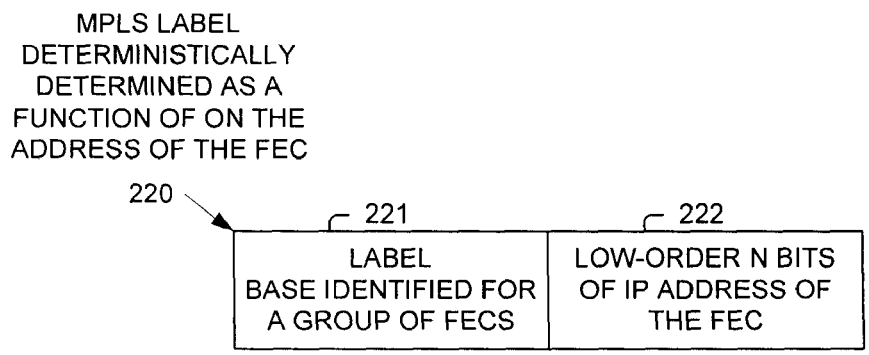
FIG. 2C illustrates an example of a deterministically determining a MPLS label as a function of an address of a Forwarding Equivalence Class used in one embodiment.

FIG. 2C illustrates an example of a deterministically determined MPLS label 220 (e.g., 20-bits), which consists of the corresponding label base identifier 221 concatenated with the N low-order bits (222) of the IP address of the FEC. In one embodiment, the value of N is at least thirteen. In one embodiment, the value of N is twenty, and in which case, the label base identifier (221) is null (i.e., no bits). In one embodiment, a different set of twenty bits is extracted directly from, or is hashed or otherwise determined from, the IP address of the FEC.

Figure 3:
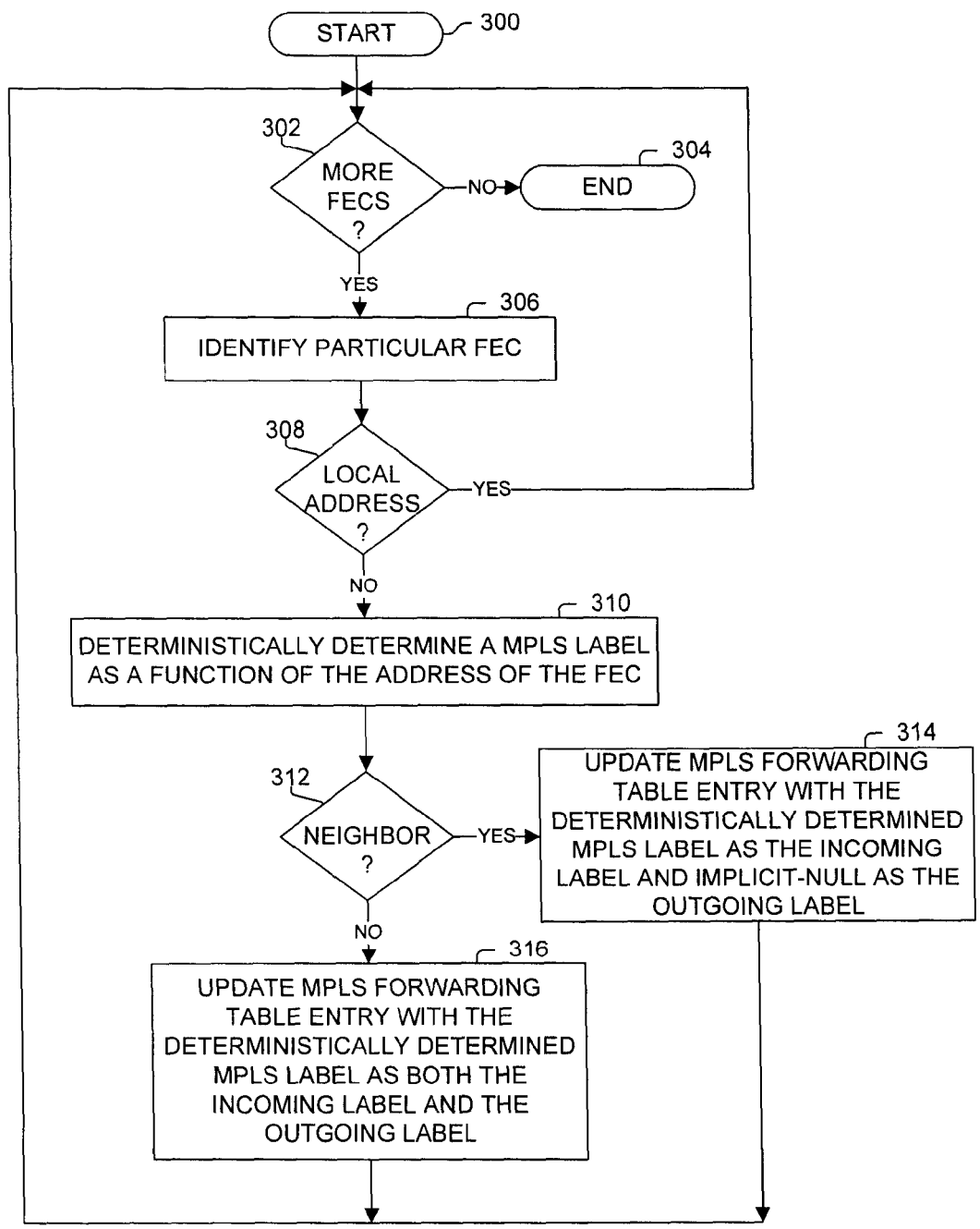
FIG. 3 illustrates a process used in one embodiment for deterministically determining MPLS labels and updating a MPLS Forwarding Table.

FIG. 3 illustrates a process used in one embodiment for deterministically determining MPLS labels as functions of addresses of Forwarding Equivalence Classes, and updating a MPLS forwarding table accordingly. Processing begins with process block 300. As determined in process block 302, when there are no more FECs to process, processing is complete of the flow diagram of FIG. 3 as indicated by process block 304. Otherwise, in process block 306, a particular FEC is identified. As determined in process block 308, if the FEC corresponds to a local address of the packet switching device, then processing returns to process block 302 as the MPLS forwarding table does not need to be updated. Otherwise, in process block 310, a MPLS label is deterministically determined based on the address of the FEC. As determined in process block 312 (such as by consulting a topology table statically created or created via a routing protocol), if the FEC corresponds to a MPLS directly connected neighbor, then in process block 314, the MPLS forwarding table is updated to associate the value of the deterministically determined MPLS label as the incoming MPLS label with implicit-null as the outgoing MPLS label; otherwise, in process block 316, the MPLS forwarding table is updated to associate the value of the deterministically determined MPLS label as both the incoming MPLS label and the outgoing MPLS label. Processing returns to process block 302.

Figure 4A:
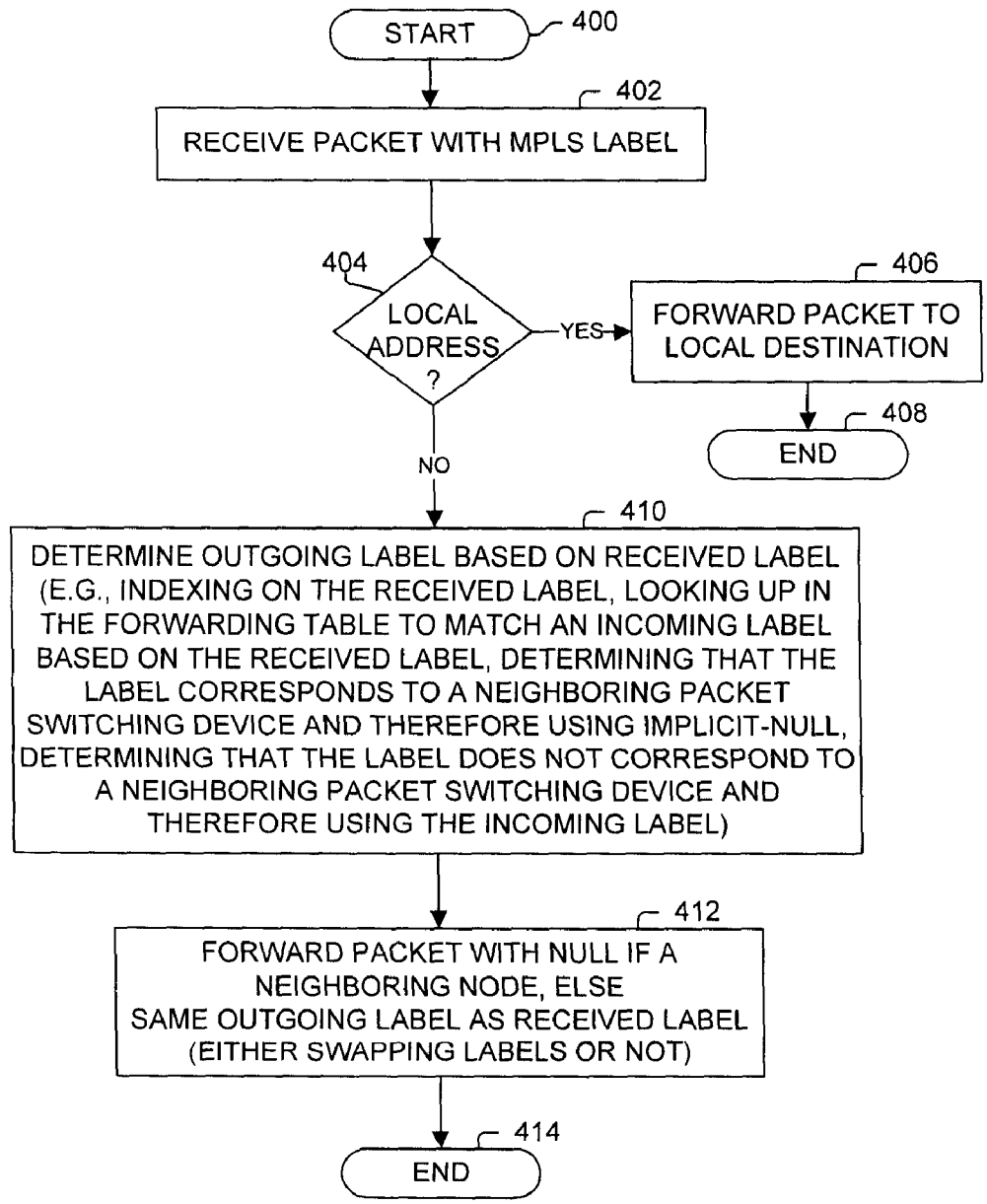
FIG. 4A illustrates a process used in one embodiment for forwarding a packet using deterministically determined MPLS labels.

FIG. 4A illustrates a process used in one embodiment for forwarding a packet using deterministically determined MPLS labels. Processing begins with process block 400, and proceeds to process block 402, wherein a packet is received with a MPLS label as part of its label stack for directing how to forward the packet. As determined in process block 404, if the label corresponds to a local address, then in process block 406, the packet is forwarded to the local destination; and processing of the flow diagram of FIG. 4A is completed as illustrated by process block 408. Otherwise, in process block 410, the outgoing MPLS label is determined based on the received label. In one embodiment, this is accomplished by matching or indexing the received label in the MPLS forwarding table. In one embodiment, this approach is used as it allows an additional one or more values to be retrieved from the forwarding table (e.g., outgoing interface). In one embodiment, this determination of the outgoing packet switching device is simplified as the label corresponds to a neighboring packet switching device, then the outgoing label will have the value of implicit-null; otherwise, the outgoing label is the same as the received label. In process block 412, the packet is forwarded with the determined outgoing label. In one embodiment, if a same label value is to be used, the packet switching device still swaps the received label with the outgoing label; while in one embodiment, this operation of swapping the same label value is eliminated. Processing of the flow diagram of FIG. 4A is complete as illustrated by process block 414.

Figure 4B:
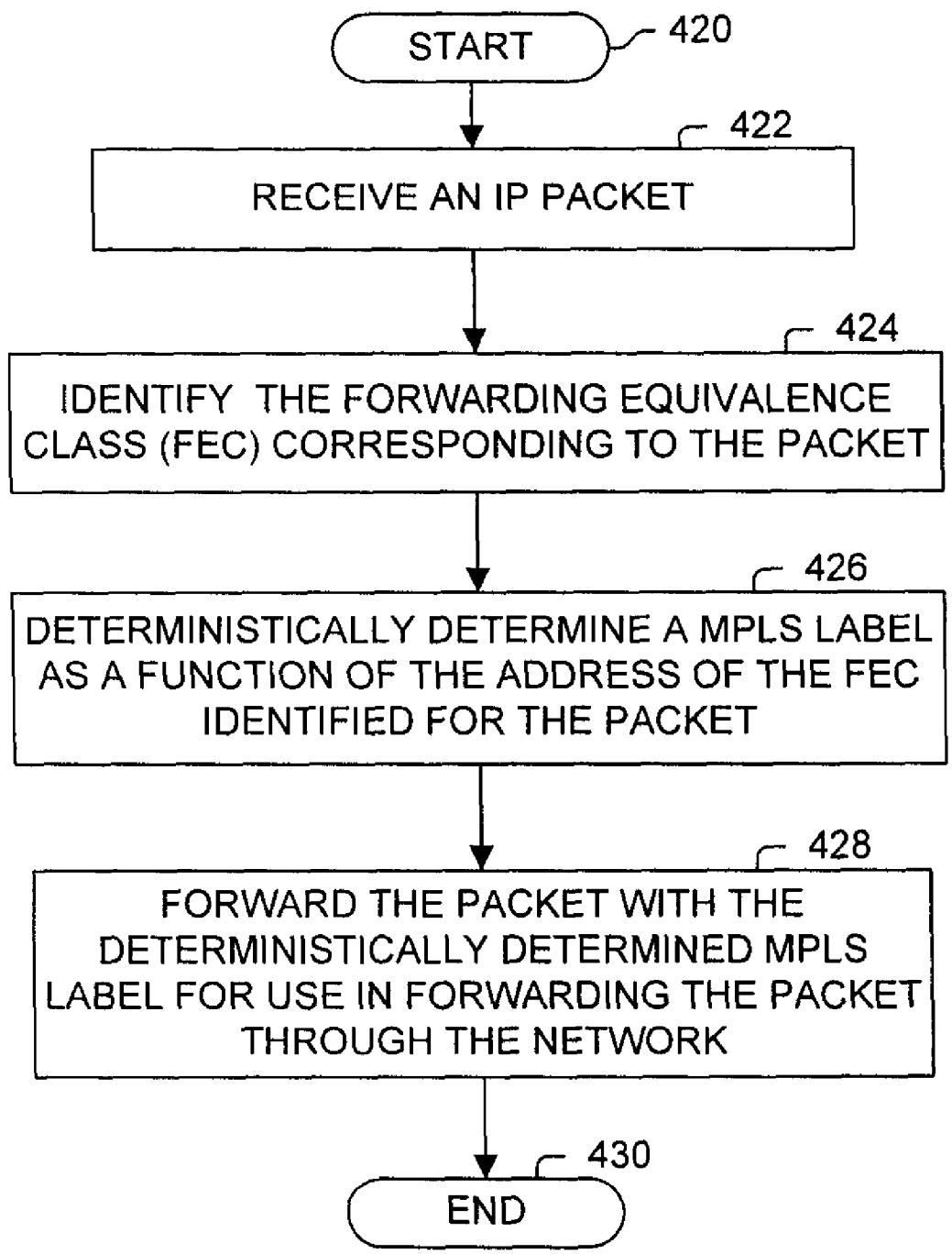
FIG. 4B illustrates a process used in one embodiment for forwarding a packet, including deterministically determining a MPLS label to use for a received packet.

FIG. 4B illustrates a process used in one embodiment for forwarding a packet, including deterministically determining a MPLS label to use for a received packet. Processing begins with process block 420; and proceeds to process block 422, wherein an IP packet is received. In process block 424, the corresponding FEC for the packet is determined. In process block 426, the MPLS label for the corresponding FEC is deterministically determined based on the IP address of the FEC. In process block 428, the packet is forwarded with the deterministically determined MPLS label as part of its label stack for use in forwarding the packet through the network. Processing of the flow diagram of FIG. 4B is complete as indicated by process block 430.

Figure 4C:
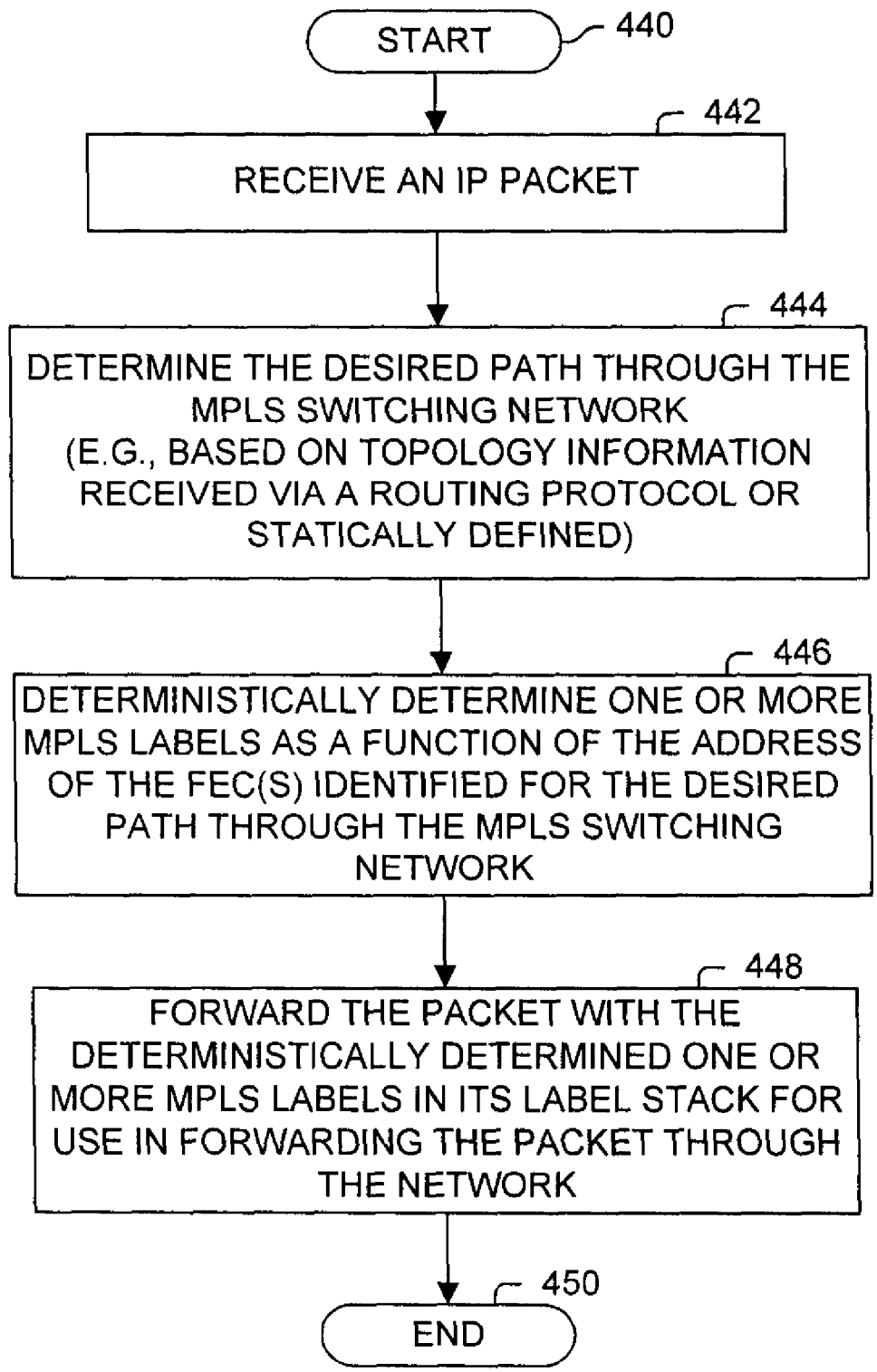
FIG. 4C illustrates a process used in one embodiment for forwarding a packet using deterministically determined MPLS labels.

FIG. 4C illustrates a process used in one embodiment for forwarding a packet using deterministically determined MPLS labels. In one embodiment, this process is used for explicit path routing of packets. In one embodiment, this process is used for fast rerouting of packets. Processing begins with process block 440; and proceeds to process block 442, wherein an IP packet is received. In process block 444, the desired path through the MPLS switching network is determined, such as by, but not limited to consulting network topology information statically provided or acquired via a routing protocol or retrieving a previously. In process block 446, one or more MPLS labels are deterministically determined based on the addresses of one of more FECs along the desired path through the MPLS switching network. These labels could specify a complete path (e.g., every packet switch along the way), or a portion of the packet switches along the desired path. In process block 448, the packet is forwarded with the deterministically determined one or more MPLS labels in its label stack for use in forwarding the packet through the network. Processing of the flow diagram of FIG. 4C is complete as illustrated by process block 450.

Figure 5:
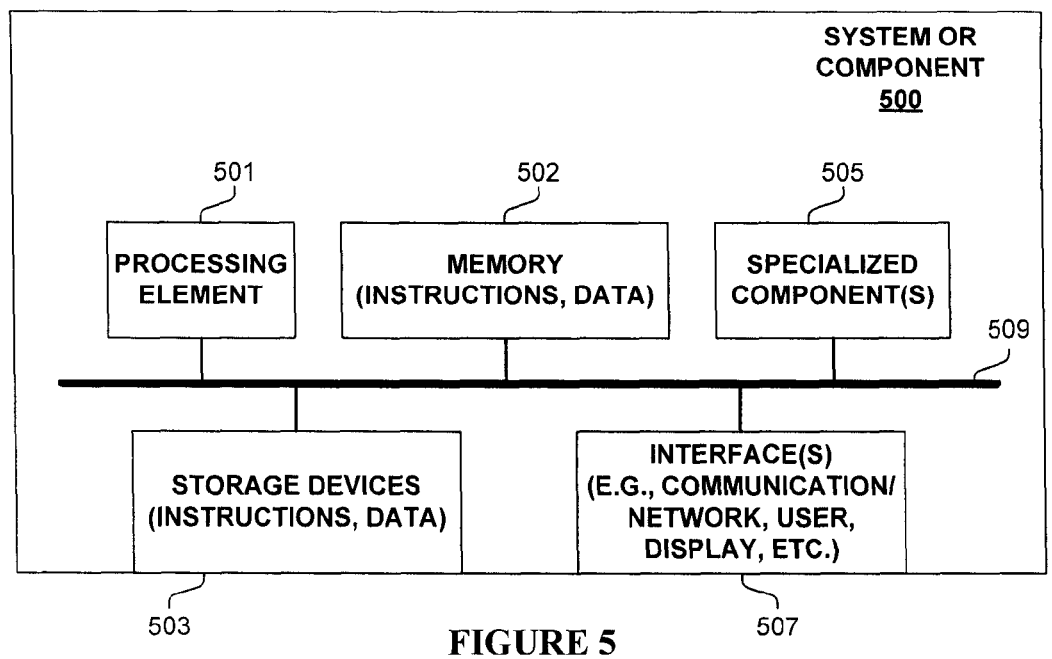
FIG. 5 illustrates an example system or component used in one embodiment.

FIG. 5 is block diagram of a system or component 500 used in one embodiment that deterministically determines MPLS labels and uses them for forwarding packets through a network. In one embodiment, system or component 500 performs one or more processes corresponding to one of the flow diagrams illustrated or otherwise described herein.

In one embodiment, system or component 500 includes a processing element 501, memory 502, storage devices 503, specialized components 505 (e.g. optimized hardware such as for performing lookup operations, etc.), and interfaces 507 for communicating information (e.g., sending and receiving packets, user-interfaces, displaying information, etc.), which are typically communicatively coupled via one or more communications mechanisms 509, with the communications paths typically tailored to meet the needs of the application.

Various embodiments of component 500 may include more or less elements. The operation of component 500 is typically controlled by processing element 501 using memory 502 and storage devices 503 to perform one or more tasks or processes. Memory 502 is one type of computer-readable medium, and typically comprises random access memory (RAM), read only memory (ROM), flash memory, integrated circuits, and/or other memory components. Memory 502 typically stores computer-executable instructions to be executed by processing element 501 and/or data which is manipulated by processing element 501 for implementing functionality in accordance with an embodiment. Storage devices 503 are another type of computer-readable medium, and typically comprise solid state storage media, disk drives, diskettes, networked services, tape drives, and other storage devices. Storage devices 503 typically store computer-executable instructions to be executed by processing element 501 and/or data which is manipulated by processing element 501 for implementing functionality in accordance with an embodiment.

Figure 6:
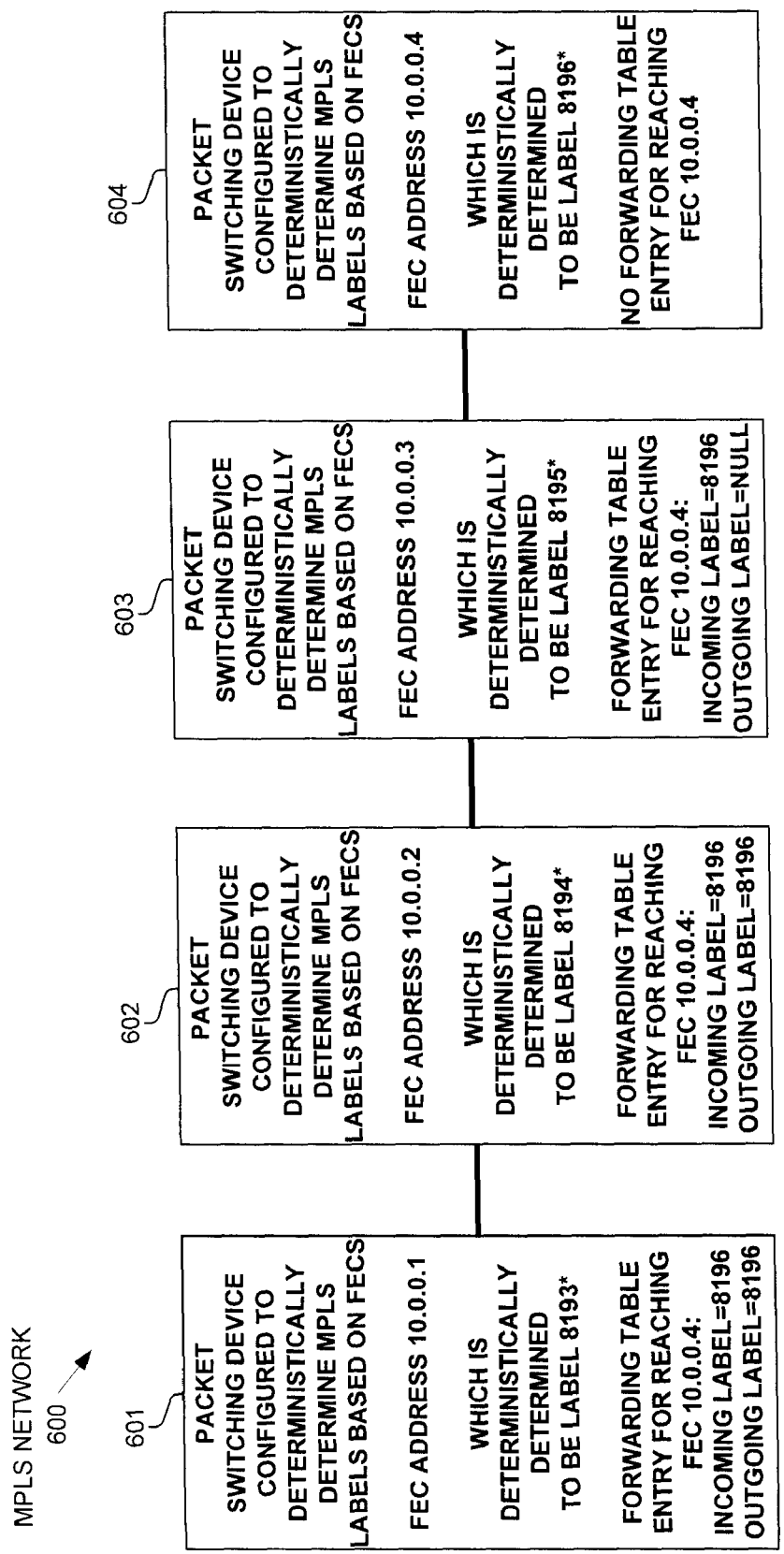
FIG. 6 illustrates an example network of MPLS packet switching devices using MPLS labels deterministically determined in one embodiment.

FIG. 6 illustrates an example network 600 of MPLS packet switching devices (601-604) using deterministically determined MPLS labels as performed in one embodiment. In this example, each of packet switching devices 601-604 is configured to deterministically determine MPLS labels based on addresses of FECs. Packet switching device 601 has FEC address 10.0.0.1; packet device 602 has FEC address 10.0.0.2; packet device 603 has FEC address 10.0.0.3; and packet device 604 has FEC address 10.0.0.4. For this example, the label base identifier for all FECs will be one; and the deterministic determination will be made by concatenating the label base identifier with the low-order thirteen bits of the FEC's IP address. Therefore, the corresponding labels for packet switching device 601 is 8193; for packet switching device 602 is 8194; packet switching device 603 is 8195; and packet switching device 604 is 8196.

In this example, each of the four packet switching devices 601-604 can deterministically determine the value of 8196 as the label bound by all of the packet switching devices in network 600 to FEC 10.0.0.4 (e.g., without any of these packet switching devices publishing their bindings, such as via LDP). Therefore, each of these packet switching devices can update their forwarding tables with the appropriate incoming and outgoing label associations.

Figure 7:
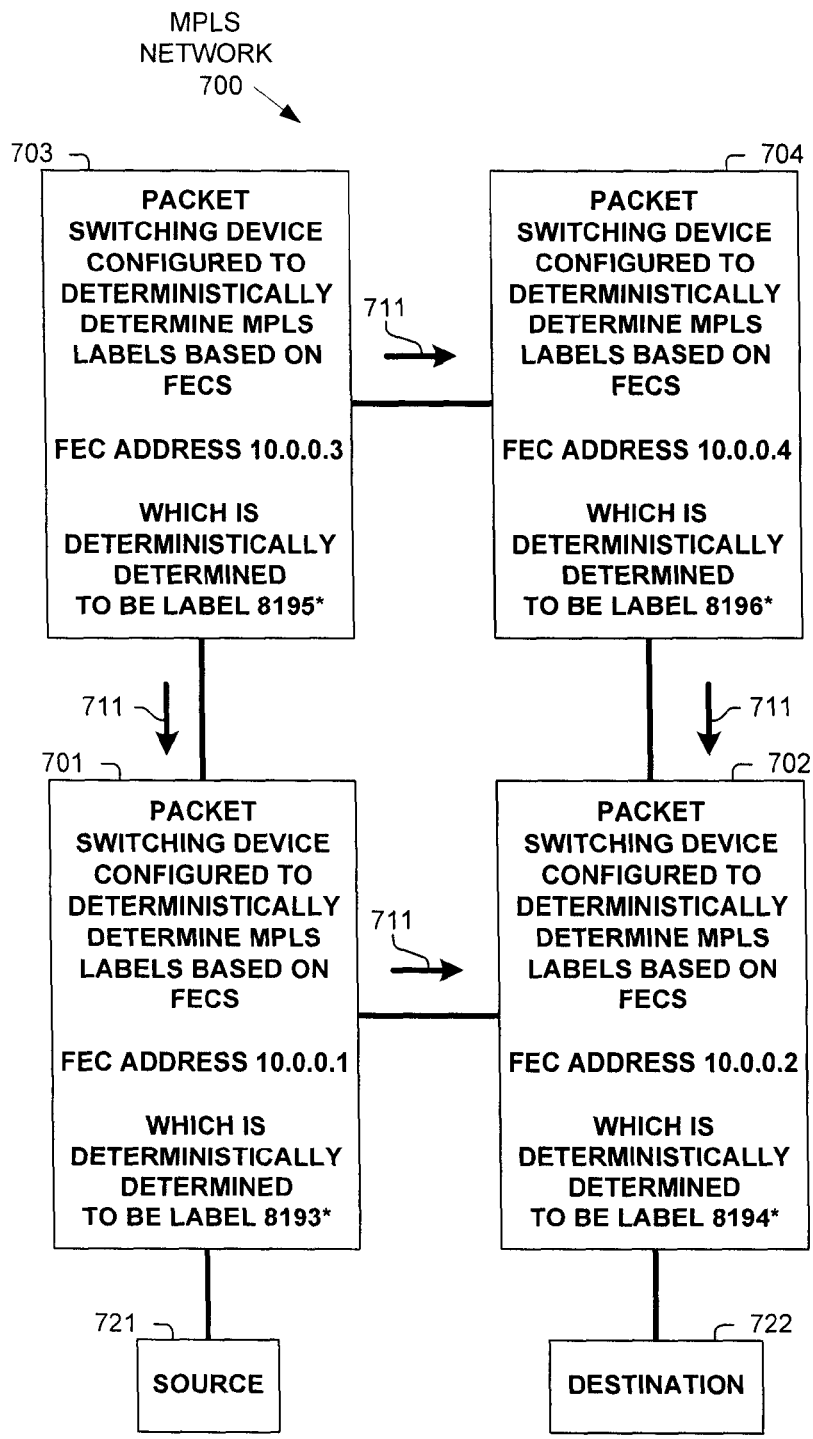
FIG. 7 illustrates an example network of MPLS packet switching devices using MPLS labels deterministically determined in one embodiment.

FIG. 7 illustrates an example network 700 of MPLS packet switching devices 701-704 with addresses and deterministically determined MPLS labels as described in relation to packet switching devices 601-604, respectively, of FIG. 6.

This example illustrates that by a packet switching device knowing the MPLS labels used by other packet switching devices, can perform explicit path forwarding or fast rerouting of packets, such as, but not limited to that described in relation to FIG. 4C.

As shown, source 721 sends packets to destination 722, with arrows 711 illustrating the standard forwarding of the packets, such as that based on least-cost forwarding. If for example, packet switching device 701 wishes to send the packets via packet switching devices 703 and 704, it simply can create a corresponding label stack to cause the packet to traverse the complete path, or at least traverse to packet switching device 703, which will then forward the packet via packet switching device 704.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
    a Multiprotocol Label Switching (MPLS) forwarding table including a plurality of forwarding table entries, with each said forwarding table entry associating an incoming label with an outgoing label;
    one or more processing elements configured to: deterministically determine for each of a plurality of Forwarding Equivalence Classes (FECs) a Multiprotocol Label Switching (MPLS) label as a function of the IP address of the FEC, and to update the MPLS forwarding table such that said deterministically determined MPLS label is both said incoming label and said outgoing label for one of the plurality of forwarding table entries.

2. The apparatus of claim 1, wherein said deterministically determining the MPLS label includes copying a plurality of bits from the IP address of the FEC into the MPLS label.

3. The apparatus of claim 2, wherein said deterministically determining the MPLS label includes copying the low order n bits of the destination address into the MPLS label, wherein n is an integer greater than zero.

4. The apparatus of claim 3, wherein n is at least thirteen.

5. The apparatus of claim 4, wherein the MPLS label consists of twenty bits.

6. The apparatus of claim 2, wherein said deterministically determining the MPLS label comprises including a label base identifier in the MPLS label, the label base identifier uniquely identifying a portion of IP addresses of a plurality of portions of IP addresses for a network such that each FEC in the network is guaranteed to have a different said deterministically determined MPLS label despite the same value for said copied plurality of bits for two different FECs in two different portions of the plurality of portions of IP addresses.

7. The apparatus of claim 6, wherein the apparatus is configured to run a routing protocol to determine routing information for packet switching devices in the network, the routing protocol including an attribute for associating label base identifiers with the plurality of portions of IP addresses.

8. The apparatus of claim 6, wherein the apparatus is configured to retrieve the label base from a data structure stored in storage in the apparatus based on the IP address of the FEC.

9. The apparatus of claim 6, wherein the apparatus is configured to lookup a particular MPLS label received in a packet in the MPLS forwarding table to determine a particular outgoing label, and to forward the packet from the apparatus with the particular outgoing label.

10. The apparatus of claim 1, wherein the apparatus is configured to, in response to identifying that the a particular MPLS label received in a packet does not correspond to a local address of the apparatus or a directly connected neighbor, forward the packet from the apparatus with the particular outgoing label.

11. The apparatus of claim 1, wherein said one or more processing elements are configured to, for each one or more FECs of directly connected neighbors, deterministically determine a MPLS label as a function of the IP address of the FEC, and to update the MPLS forwarding table such that said deterministically determined MPLS label is said incoming label and said outgoing label is null or another indication of a directly connected neighbor for one of the plurality of forwarding table entries.

12. The apparatus of claim 11, wherein the apparatus is configured to, in response to identifying that the a particular MPLS label received in a packet does not correspond to a local address of the apparatus or a directly connected neighbor, forward the packet from the apparatus with the particular outgoing label.

13. The apparatus of claim 1, wherein the apparatus is not configured to receive remote bindings of one or more FECs to corresponding one or more labels.

14. The apparatus of claim 1, wherein the apparatus is configured to perform fast rerouting of a plurality of packets based on said deterministically determined labels neither using predefined tunnels nor using Resource Reservation Protocol (RSVP).

15. The apparatus of claim 1, wherein the apparatus is configured to perform explicit routing of a plurality of packets based on said deterministically determined labels without any received remote label binding information.

16. The apparatus of claim 15, wherein said explicit routing of packets is performed neither using predefined tunnels nor using Resource Reservation Protocol (RSVP).

17. A method performed by a packet switching device, the method comprising: for each particular Forwarding Equivalence Class (FEC) of a plurality of FECs:
deterministically determining a Multiprotocol Label Switching (MPLS) label as a function of the IP address of the particular FEC; and
updating Multiprotocol Label Switching (MPLS) forwarding table in storage in the packet switching device, the MPLS forwarding table including a plurality of forwarding table entries, with each said forwarding table entry associating an incoming label with an outgoing label; wherein said updating the MPLS forwarding table includes setting said deterministically determined MPLS label as both said incoming label and said outgoing label of one of the plurality of forwarding table entries.

18. The method of claim 17, comprising: for each particular packet of a plurality of packets: performing a lookup operation in the MPLS forwarding table based on an incoming label received in the particular packet to identify a particular outgoing label, and forwarding the particular packet from the packet switching device with the particular outgoing label.

19. The method of claim 17, wherein said deterministically determining the MPLS label includes copying a plurality of bits from the IP address of the FEC into the MPLS label.

20. The method of claim 17, wherein each of the plurality of FECS are neither a local address nor an address of a directly connected neighbor.

21. A method performed by packet switching device, the method comprising:
receiving a packet;
identifying a Forwarding Equivalence Class (FEC) address of the packet;
deterministically determining a Multiprotocol Label Switching (MPLS) label for the packet as a function of the FEC address, including manipulating the FEC address of the packet; and
forwarding said received packet with said deterministically determined MPLS label;
wherein said manipulating the FEC address includes copying a plurality of bits or values from the FEC address into the MPLS label.

22. An network comprising:
a plurality of Multiprotocol Label Switching (MPLS) packet switching devices communicatively coupled together and configured to forward packets using MPLS for a plurality of Forwarding Equivalence Classes (FECs);
wherein each particular packet switching device of the plurality of packet switching devices is configured, for each particular FEC of the plurality of FECs that is not a local address of the particular packet switching device: to deterministically determine a MPLS label as a function of the IP address of the particular FEC; and if the particular FEC is not an address of a directly connected neighbor to the particular packet switching device, to use said deterministically determined MPLS label as both the incoming label and the outgoing label in a forwarding table entry for use in forwarding packets in the network, else to use said deterministically determined MPLS label as the incoming label with the corresponding outgoing label of a forwarding table entry being null or another indication of a directly connected neighbor; wherein said deterministic determination is not performed based on any received remote bindings from another of said MPLS packet switching devices.

23. The network of claim 22, wherein each of the plurality of MPLS packet switching devices is not configured to run Label Distribution Protocol (LDP).

24. A packet switching device, comprising:
one or more processing elements configured to deterministically determine a Multiprotocol Label Switching (MPLS) label for a MPLS Forwarding Equivalence Class (FEC) based on manipulation of an address of the FEC; and
a memory or other storage device configured for storing said deterministically determined MPLS label in a manner retrievable based on a MPLS incoming label;
wherein the packet switching device is configured to: receive a packet with the MPLS incoming label; retrieve said deterministically determined MPLS label based on the MPLS incoming label of the packet; and to modify the packet to include said retrieved deterministically determined MPLS label in a label stack; and to send said modified packet from the packet switching device;
wherein said manipulation of the address of the FEC includes: copying a plurality of bits or values from the address of the FEC into said deterministically determined MPLS label.

* * * * *